(12) United States Patent
Le Gall et al.

(10) Patent No.: US 12,209,423 B2
(45) Date of Patent: Jan. 28, 2025

(54) JOINING PART FOR A SYSTEM FOR PARTITIONING AND PROTECTING A PREMISES, PROP AND PARTITIONING SYSTEM PROVIDED WITH SUCH A JOINING PART, AND METHOD FOR IMPLEMENTATION THEREOF

(71) Applicant: Stéphanie Le Gall, Dinard (FR)

(72) Inventors: Stéphanie Le Gall, Dinard (FR);
Philippe Chancerel, Glos la Ferriere (FR)

(73) Assignee: Stéphanie Le Gall, Dinard (FR)

( * ) Notice: Subject to any disclaimer, the term of this patent is extended or adjusted under 35 U.S.C. 154(b) by 596 days.

(21) Appl. No.: 17/431,213

(22) PCT Filed: Feb. 4, 2020

(86) PCT No.: PCT/EP2020/052684
§ 371 (c)(1),
(2) Date: Aug. 16, 2021

(87) PCT Pub. No.: WO2020/169330
PCT Pub. Date: Aug. 27, 2020

(65) Prior Publication Data
US 2022/0136266 A1  May 5, 2022

(30) Foreign Application Priority Data
Feb. 18, 2019   (FR) ...................................... 1901608

(51) Int. Cl.
*E04G 21/24*   (2006.01)
*E04G 25/04*   (2006.01)
(Continued)

(52) U.S. Cl.
CPC ........... *E04G 21/243* (2013.01); *E04G 25/04* (2013.01); *E04G 2021/248* (2013.01);
(Continued)

(58) Field of Classification Search
CPC ....... E04G 21/24; E04G 21/243; E04G 21/30; E04G 2021/248; E04G 25/04;
(Continued)

(56) References Cited

U.S. PATENT DOCUMENTS 1,326,006 A * 6/1927 Sterhardt ................ E04H 15/46
135/905
1,631,215 A * 6/1927 Leffert .................... E04H 15/46
135/905
(Continued)

FOREIGN PATENT DOCUMENTS

CN     107254990 A * 10/2017  ............. E04H 15/46
CN     217925205 U * 11/2022  ............. E04H 15/06
(Continued)

*Primary Examiner* — Ryan D Kwiecinski
(74) *Attorney, Agent, or Firm* — Bauer & Joseph

(57) ABSTRACT

A joining part for a multipurpose system for partitioning a premise and protecting it, regardless of its configuration, in particular angular, includes a contact pad with a bearing surface comprising a cylinder. Two superposed rings are fitted around the cylinder of the pad and are mounted so as to rotate with respect to one another. Each ring includes a protrusion for fastening a longitudinal element of the partitioning system. The joining part also includes a support base for a telescopic prop. The support base and the contact pad include complementary fastening means configured such that the rings are free to rotate about the cylinder but butt against the pad and the base.

17 Claims, 5 Drawing Sheets

(51) Int. Cl.
*E04G 21/28* (2006.01)
*E04G 21/30* (2006.01)
*E04G 25/00* (2006.01)

(52) U.S. Cl.
CPC .............. *E04G 21/28* (2013.01); *E04G 21/30* (2013.01); *E04G 2025/006* (2013.01)

(58) Field of Classification Search
CPC ... E04G 2025/006; E04H 15/46; E04H 15/48; E04H 15/60; E04H 15/642; E04H 15/644; E04H 15/646; F16C 11/10; Y10T 403/32254; Y10T 403/32368
USPC .................................................... 403/97, 103
See application file for complete search history.

(56) References Cited

U.S. PATENT DOCUMENTS

| | | | | |
|---|---|---|---|---|
| 5,143,468 A * | 9/1992 | Pausch | ............... | F16M 11/12 16/322 |
| 5,661,942 A * | 9/1997 | Palmer | ............... | E04H 15/48 135/156 |
| 5,685,112 A * | 11/1997 | Fara | ............... | E04G 21/32 52/745.15 |
| 5,924,469 A * | 7/1999 | Whittemore | ............... | E04G 21/30 248/200.1 |
| 6,086,284 A * | 7/2000 | Callahan | ............... | F16C 11/10 403/103 |
| 6,196,568 B1 * | 3/2001 | Stevens | ............... | A61G 5/12 403/107 |
| 6,343,406 B1 * | 2/2002 | Yeh | ............... | E06C 1/32 182/163 |
| 7,073,758 B2 * | 7/2006 | Whittemore | ............... | E04G 21/30 248/230.4 |
| 7,188,636 B1 * | 3/2007 | Kanne | ............... | E04G 21/243 135/900 |
| 7,314,078 B2 * | 1/2008 | Melino, Jr. | ............... | E04G 21/30 160/368.1 |
| 7,533,712 B2 * | 5/2009 | Whittemore | ............... | E04G 21/243 248/200.1 |
| 7,631,575 B2 * | 12/2009 | Gard | ............... | F16C 11/10 74/530 |
| 7,658,219 B2 * | 2/2010 | Whittemore | ............... | E04G 21/243 248/200.1 |
| 7,717,382 B2 * | 5/2010 | Whittemore | ............... | E04G 21/24 156/577 |
| 7,789,927 B2 * | 9/2010 | Tramontina | ............... | E04G 21/30 55/491 |
| 8,074,700 B1 * | 12/2011 | Melino | ............... | E04G 25/04 160/368.1 |
| 9,062,468 B2 * | 6/2015 | Behringer | ............... | E04G 21/243 |
| 9,068,602 B2 * | 6/2015 | Hoe | ............... | F16C 11/10 |
| 9,534,628 B1 * | 1/2017 | Wang | ............... | F16C 11/10 |
| 9,657,514 B1 * | 5/2017 | Whittemore | ............... | E04G 21/241 |
| 9,663,962 B1 * | 5/2017 | Whittemore | ............... | E04G 21/24 |
| 10,058,186 B2 * | 8/2018 | Rivera | ............... | E04H 15/48 |
| 10,081,955 B2 * | 9/2018 | Whittemore | ............... | E04G 25/00 |
| 10,113,323 B2 * | 10/2018 | Lutes | ............... | E04G 25/04 |
| 10,383,307 B2 * | 8/2019 | Nelson | ............... | F16C 11/10 |
| 10,428,539 B2 * | 10/2019 | Whittemore | ............... | F16M 13/022 |
| 10,472,849 B2 * | 11/2019 | Carter | ............... | E04H 15/50 |
| 10,653,107 B2 * | 5/2020 | Nelson | ............... | A01K 1/0125 |
| 10,704,279 B2 * | 7/2020 | Hohmann | ............... | E04G 21/32 |
| 10,781,597 B2 * | 9/2020 | Whittemore | ............... | E04G 21/243 |
| 10,801,261 B2 * | 10/2020 | Peterson | ............... | E06C 1/10 |
| 10,822,761 B1 * | 11/2020 | Voyen | ............... | E04G 25/04 |
| 10,988,948 B2 * | 4/2021 | May | ............... | E04G 25/06 |
| 11,441,323 B2 * | 9/2022 | Whittemore | ............... | E04G 21/243 |
| 11,666,125 B2 * | 6/2023 | Yamagata | ............... | A45B 23/00 135/15.1 |
| 11,814,809 B1 * | 11/2023 | Tran | ............... | E02D 5/223 |
| 11,821,228 B2 * | 11/2023 | Sun | ............... | E04H 15/60 |
| 11,920,360 B2 * | 3/2024 | Whittemore | ............... | E04G 21/243 |
| 2002/0131814 A1 * | 9/2002 | Hou | ............... | B62B 9/20 403/97 |
| 2002/0159824 A1 * | 10/2002 | Marquina | ............... | B60N 2/767 403/97 |
| 2003/0202840 A1 * | 10/2003 | Watkins | ............... | F16C 11/10 403/97 |
| 2007/0257170 A1 * | 11/2007 | Whittemore | ............... | F16M 13/027 248/229.16 |
| 2008/0109994 A1 * | 5/2008 | Liao | ............... | B62B 5/06 16/319 |
| 2008/0185111 A1 * | 8/2008 | Zagone | ............... | E04G 21/243 248/200.1 |
| 2008/0271769 A1 * | 11/2008 | Lah | ............... | E04H 15/60 135/120.3 |
| 2009/0307990 A1 * | 12/2009 | Muehlebach | ............... | E04B 2/822 52/63 |
| 2010/0276090 A1 * | 11/2010 | Zagone | ............... | E04G 21/243 160/368.1 |
| 2011/0036520 A1 * | 2/2011 | Akers | ............... | E04G 25/00 248/219.2 |
| 2013/0099077 A1 * | 4/2013 | Akers | ............... | F16M 13/00 248/219.4 |
| 2014/0030006 A1 * | 1/2014 | Lee | ............... | E04H 15/50 403/116 |
| 2014/0075851 A1 * | 3/2014 | Rhines | ............... | E04G 21/30 52/63 |
| 2014/0263916 A1 * | 9/2014 | Behringer | ............... | E04G 21/243 248/357 |
| 2015/0041252 A1 * | 2/2015 | Grumberg | ............... | E04G 5/165 182/222 |
| 2017/0020322 A1 * | 1/2017 | Whittemore | ............... | E04G 25/00 |
| 2018/0023314 A1 * | 1/2018 | Day | ............... | E04H 15/60 135/123 |
| 2018/0030752 A1 * | 2/2018 | Chen | ............... | E04H 15/60 |
| 2021/0123261 A1 * | 4/2021 | Regus | ............... | E04H 15/44 |
| 2021/0332607 A1 * | 10/2021 | Goldszer | ............... | B62B 3/02 |
| 2022/0081963 A1 * | 3/2022 | Whittemore | ............... | E06B 3/32 |
| 2022/0136266 A1 * | 5/2022 | Le Gall | ............... | E04G 21/243 160/368.1 |
| 2022/0205270 A1 * | 6/2022 | Jerry | ............... | E04H 15/38 |
| 2023/0258007 A1 * | 8/2023 | Clancy | ............... | E04G 21/243 160/368.1 |

FOREIGN PATENT DOCUMENTS

| | | | | |
|---|---|---|---|---|
| DE | 29723233 U1 * | 9/1998 | ............. | E04B 2/821 |
| DE | 102013213611 A1 * | 1/2014 | ............. | A47D 1/02 |
| DE | 102018123387 A1 * | 3/2020 | ............. | E01D 21/00 |
| EP | 2378032 A1 * | 10/2011 | ............. | E04G 21/24 |
| EP | 2578774 A2 * | 4/2013 | ............. | E04G 21/243 |
| EP | 2921611 A1 * | 9/2015 | ............. | E04G 21/241 |
| EP | 3620595 A1 * | 3/2020 | ............. | E04G 21/243 |
| FR | 3057596 A1 * | 4/2018 | | |
| FR | 3092849 A1 * | 8/2020 | ............. | E04G 21/243 |
| GB | 2468847 A * | 9/2010 | ............. | E02D 17/10 |
| JP | 2004346645 A * | 12/2004 | ............. | E04G 21/243 |
| WO | WO-9211427 A1 * | 7/1992 | ............. | E04G 25/00 |
| WO | WO-9713940 A1 * | 4/1997 | ............. | E04G 21/24 |
| WO | WO-9819027 A1 * | 5/1998 | ............. | A47H 21/00 |
| WO | WO-2007121762 A1 * | 11/2007 | ............. | E04B 2/822 |
| WO | WO-2015048513 A1 * | 4/2015 | ............. | E04G 21/243 |
| WO | WO-2015070312 A1 * | 5/2015 | ............. | E04G 25/04 |
| WO | 2015/140301 | 9/2015 | | |
| WO | WO-2015140301 A1 * | 9/2015 | ............. | E04G 21/241 |
| WO | 2018/073534 | 4/2018 | | |
| WO | WO-2018073534 A1 * | 4/2018 | | |
| WO | WO-2020146862 A1 * | 7/2020 | ............. | E04G 21/243 |
| WO | WO-2020146904 A1 * | 7/2020 | ............. | E04G 21/243 |
| WO | WO-2020223726 A1 * | 11/2020 | ............. | E04G 21/243 |
| WO | WO-2021122711 A1 * | 6/2021 | ............. | E04G 21/241 |
| WO | WO-2021156456 A1 * | 8/2021 | | |
| WO | WO-2024013631 A1 * | 1/2024 | | |

* cited by examiner

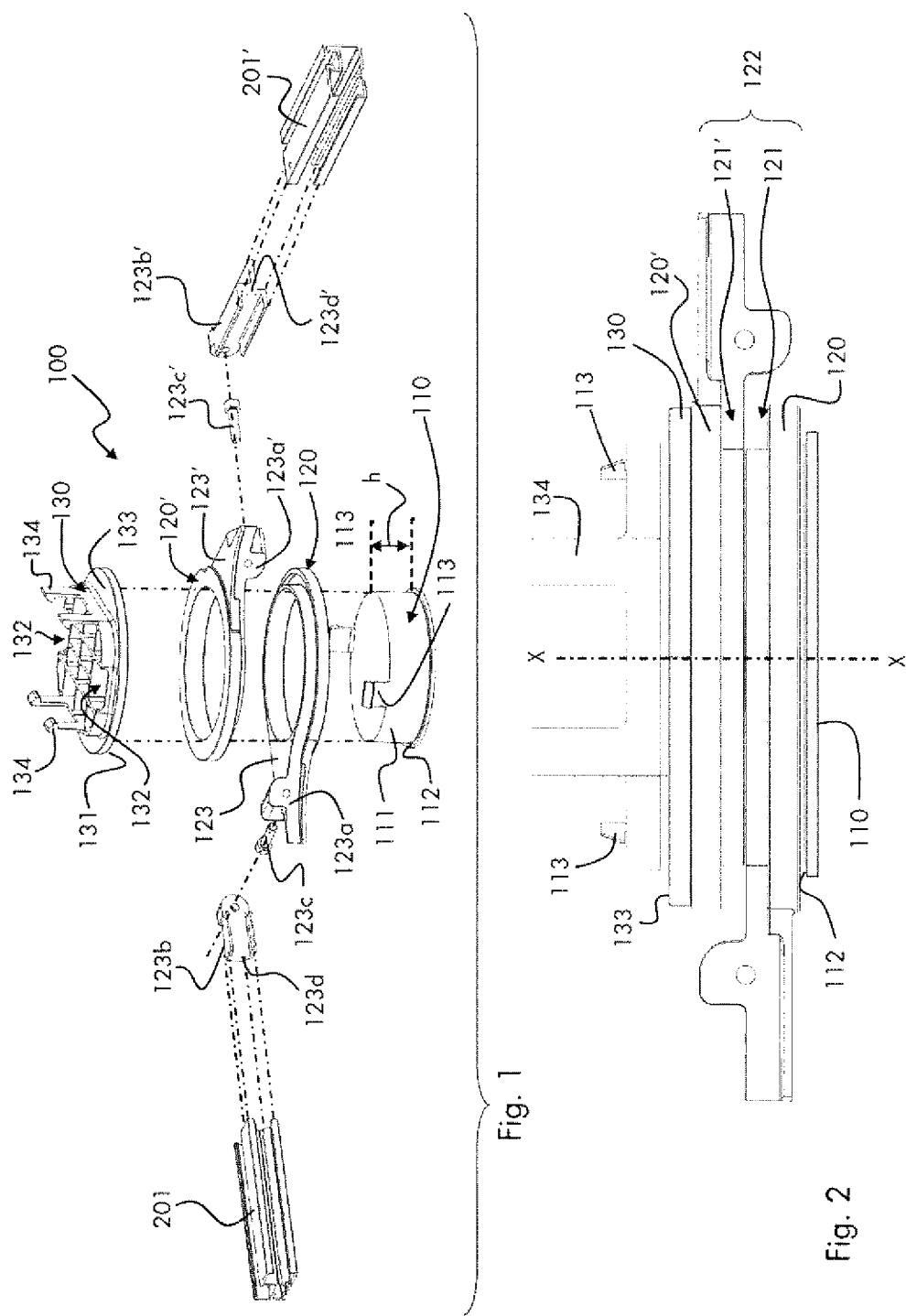

JOINING PART FOR A SYSTEM FOR PARTITIONING AND PROTECTING A PREMISES, PROP AND PARTITIONING SYSTEM PROVIDED WITH SUCH A JOINING PART, AND METHOD FOR IMPLEMENTATION THEREOF

The present invention relates to a joining part for a system for partitioning and protecting a premises.

The invention also relates to a prop provided with at least one such joining part.

The invention also relates to a partitioning and protecting system and to a method for implementing same.

The partitioning system to which the invention relates is of the type comprising a frame, generally made up of a plurality of longitudinal elements, which are preferably tubular or in the form of profiled sections, to which a flexible closing element of the tarpaulin type is fastened.

In the present invention, a frame is understood to be a rigid structure that is able to support the flexible closing element. It is not, however, essential for the structure to be closed on itself. For example, the frame may thus comprise two vertical struts and a single transverse cross member. In another nonlimiting example, the frame may be made up only of transverse cross members that are in contact with the ceiling and are held in this way by two props.

The document WO2015140301 describes an abovementioned frame that is used for closing an opening, such as a door.

That system comprises primarily four telescopic profiled sections that are arranged, in use, to the right, to the left, at the top, and at the bottom of the opening so as to form a support frame for a closing tarpaulin.

The profiled sections each comprise two grooves that are arranged such that, in the use position, the frame thus formed has a first, frontal peripheral groove and a second, lateral peripheral groove directed toward the interior of the space delimited by the frame.

The closing tarpaulin is fastened to the frame in a gripped manner by way of a seal force-fitted into the frontal peripheral groove. This tarpaulin advantageously comprises a sliding opening designed to create a temporary opening for workers to pass through.

The profiled sections are connected rigidly, by clamping, to the four corners by rigid L-shaped corner parts, and then a flat spring is optionally fastened in the lateral peripheral groove. On account of the rigid fastening between a vertical (right-hand or left-hand) profiled section, a rigid L-shaped joining part, and a horizontal (top or bottom) profiled section, each spring pushes on each horizontal and vertical strut such that they bear against the sides and the ceiling of the opening.

Such a system is used in the context of works, for example for renovating a premises of a building, which are known to be a source of dust, sometimes very volatile, which can get into and/or spread out in the other rooms of the building that are directly connected to the premises undergoing work.

The dust in question can sometimes have polluting or toxic properties, and is therefore dangerous, owing to its particle size and/or physicochemical nature.

For example, in the case of asbestos removal from a building, dust or fine residues of asbestos is/are generated, which must never be released into the environment outside the premises undergoing work.

While the system described in the document WO2015140301 makes it possible to provide a perfect seal between the parts obstructing access doors, it is only truly effective for relatively narrow openings such as doors or windows with a width of less than 1.5 meters.

This is because covering up a wide opening with this system is not effective since the horizontal telescopic profiled sections, and in particular the upper telescopic profiled section, may exhibit significant deflection, and as a result create a sizeable gap in the sealing of the system.

The document WO2018073534 describes a telescopic strut comprising two T-shaped joining parts made up of profiled sections ensuring both consistent sealing of the tarpaulin, this being essential for certain applications, and distribution of the stress that eliminates deflection over a greater distance without squeezing the profiled sections.

That document proposes an embodiment of the T-shaped resilient joining part that allows nonlinear installation of the closing system by forming an angle in the frame. This embodiment makes it possible to bypass obstacles (posts, sanitary pipes, immovable installations, etc.) without it being necessary to bear against this obstacle. It also makes it possible to partition a room.

However, that system does not have a very multipurpose nature since the angles between the alms of the T-shaped joining part are fixed. That system therefore does not make it possible to adapt to configurations of the premises, unless there are a large number of joining parts of which the arms form different angles.

Therefore, the present invention aims to propose a multipurpose partitioning and protecting system, for partitioning a premises, regardless of its configuration, in particular angular, and/or for protecting a wall by arranging the system as close as possible to the wall without otherwise being fastened thereto, like the wooden battens of conventional systems used in particular for asbestos removal.

Another objective of the invention is to provide a multipurpose closing system that is economical to manufacture, entirely disassemblable in order to be cleaned and thus able to be used during sensitive cleaning operations, in particular, but not exclusively, during asbestos removal or the removal of lead and/or silica coating.

Another objective of the invention is to provide a multipurpose closing system that is economical to manufacture, entirely disassemblable, and able to ensure consistent fastening sealing of the tarpaulin.

Specifically, the tarpaulin is fastened by gripping the edge of the tarpaulin in a groove of the profiled sections that make up the frame and by force-fitting a retaining means combined with a seal into said groove on top of the tarpaulin.

According to the invention, the closing system may be disassemblable and reusable without elements that make it up being damaged from one use to the next, so that they can be reused from one installation of a closing system to the next.

To this end, a subject of the invention is a joining part for a system for partitioning and protecting a premises of the type delimited by a floor, a ceiling, and walls, the system being of the type comprising at least two telescopic props and a plurality of longitudinal elements for forming a support frame for at least one flexible closing element of the tarpaulin type, the joining part comprising:

a contact pad with a bearing surface comprising a cylinder of given height that has a longitudinal axis and is provided with a first peripheral retaining shoulder;

two superposed rings that have been fitted around the cylinder of the contact pad and are mounted so as to rotate with respect to one another, each ring having a transverse peripheral rabbet delimited by a rabbet end wall, a rabbet bottom, and a rabbet edge, the two rabbets together forming, in a use position, a peripheral slot for reversibly fastening a fastening seal of the closing element, each ring also comprising a centrifugal protrusion for fastening a longitudinal element of the partitioning and protecting system in the use position;

a support base for a telescopic prop in the use position, provided with a second retaining shoulder, the support base and the contact pad comprising complementary fastening means, the height of the cylinder being chosen such that the rings are free to rotate about the cylinder but butt against the two retaining shoulders when the base is fastened to the shoe.

According to particular embodiments:

the two rings may be identical and arranged in opposition about the cylinder of the contact pad;

each protrusion may comprise a fixed portion for connecting to the ring and a pivoting portion for fastening a longitudinal element of the partitioning and protecting system, said pivoting portion being mounted on the fixed portion so as to be able to pivot about a pivot pin between a position coplanar with the ring that bears the protrusion and a position perpendicular to the ring that bears the protrusion;

the fixed portion may comprise a rectilinear edge connected tangentially to the end wall of the rabbet of the ring and extended by a concave curved edge connected tangentially to the edge of the rabbet;

the pivoting portion for fastening each protrusion may have an end with a section complementary to a longitudinal element of the partitioning and protecting system in order that the pivoting portion and the longitudinal element are reversibly fastened by insertion in the use position;

the pivoting portion of each protrusion may have a hook-shaped fastening end intended to be fitted reversibly around the pivot pin fastened to the fixed portion;

the support base for a prop may comprise means for reversibly fastening the prop in the use position;

the means for reversible fastening may comprise retaining claws designed to snap into place reversibly against one end of the prop in the use position; and/or the support base and/or the contact pad may comprise a reinforcing grid perpendicular to the support base.

The invention also relates to a telescopic prop for a system for partitioning and protecting a premises of the type delimited by a floor, a ceiling, and walls, the system being of the type comprising at least two telescopic props and a plurality of longitudinal elements for forming a support frame for at least one flexible closing element of the tarpaulin type, the prop comprising a telescopic longitudinal portion, a means for clamping in the deployed position, and two bearing ends, at least one of the bearing ends being fastened to a support base of an abovementioned joining part.

According to particular embodiments:

the support base of the joining part may be fastened reversibly to the bearing end;

the support base of the joining part may be fastened non-reversibly to the bearing end; and/or the telescopic longitudinal portion may comprise a frontal face, in the use position, comprising a continuous longitudinal groove for fastening the closing element.

A further subject of the invention is a system for partitioning and protecting a premises of the type delimited by a floor, a ceiling, and walls, the system being of the type comprising at least two telescopic props and a plurality of longitudinal elements for forming a support frame for at least one flexible closing element of the tarpaulin type, characterized in that it also comprises at least one abovementioned joining part.

According to particular embodiments:

the longitudinal elements for forming a frame may comprise a frontal face, in the use position, provided with a continuous peripheral groove for fastening the closing element;

the partitioning and protecting system may comprise at least one abovementioned telescopic prop.

A further subject of the invention is a method for partitioning and protecting a premises of the type delimited by a floor, a ceiling, and walls, with an abovementioned partitioning and protecting system, comprising the following steps:

A) positioning on the floor the abovementioned joining parts at locations in the premises where an angular member or propping is necessary;

B) positioning a lower end of a prop on each joining part positioned on the floor, and positioning a joining part at an upper end of each prop, then deploying the telescopic longitudinal portion of each prop until the joining part at the upper end thereof is forcibly pressed against the ceiling, then activating the means for clamping in the deployed position such that each prop is forcibly compressed between the floor and the ceiling by way of the joining parts;

C) pivoting the rings of each joining part into a desired angular position to configure the partitioning of the premises;

D) fastening longitudinal elements for forming a frame to the protrusions of the rings of the joining parts until a frame suitable for a desired configuration is formed;

E) fastening the flexible closing element of the tarpaulin type to the longitudinal elements of the frame.

In one particular embodiment, the longitudinal elements for forming a frame may comprise a frontal face, in the use position, provided with a continuous longitudinal groove for fastening the closing element, step E) being carried out by gripping the edge of the closing element in a continuous longitudinal groove of the longitudinal elements and by force-fitting metal clips into said groove on top of the tarpaulin, and then by force-fitting a continuous seal into the metal clips and into said groove.

Further features of the invention will be set out in the following detailed description, which is given with reference to the appended drawings, in which, respectively:

FIG. 1 shows a schematic exploded perspective view of a joining part according to the invention;

FIG. 2 shows a schematic side plan view of the joining part according to the invention;

Figure 10:
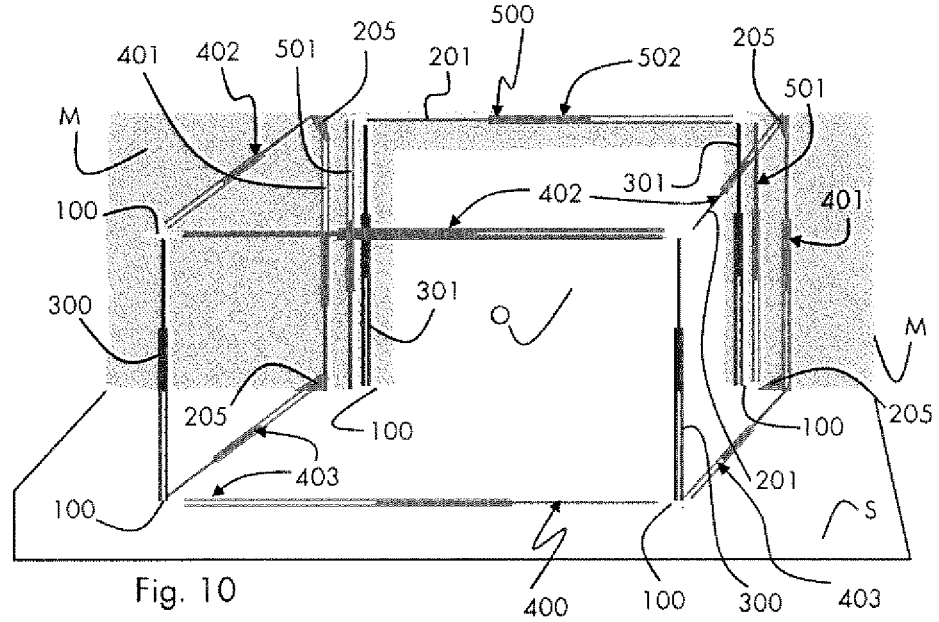
Figure 11:
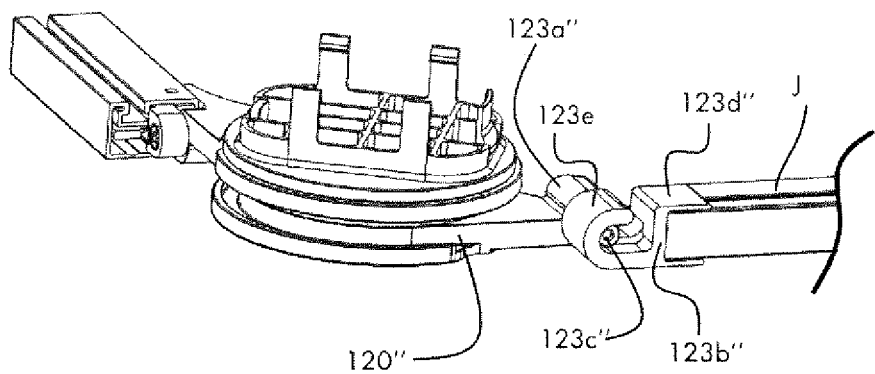

FIG. 10 shows a schematic perspective view of a partitioning system according to the invention installed in a premises so as to delimit an airlock around an opening of the premises; and FIG. 11 shows a schematic perspective view of a joining part according to the invention in which one of the protrusions comprises a pivoting portion in the form of a manually removable hook, i.e. a hook that is removable without using a tool.

Figure 9:
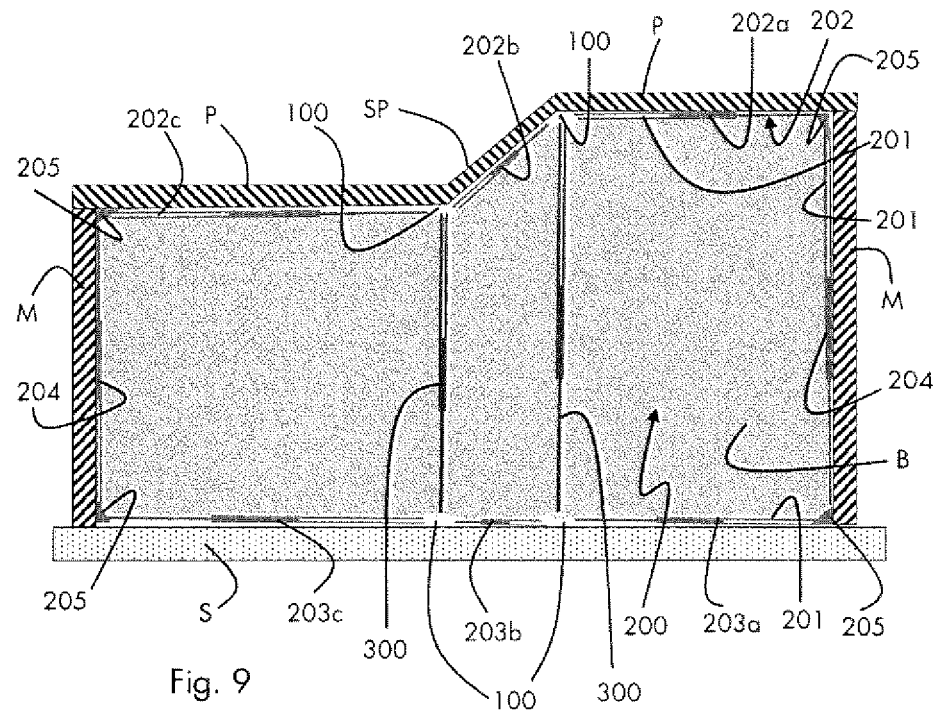
FIG. 9 shows a schematic side view of a partitioning system according to the invention installed in a premises provided with a sloping ceiling.

FIG. 1 illustrates a joining part 100 according to the invention, for a system for partitioning and protecting a premises, such as the one illustrated in FIGS. 9 and 10 by way of nonlimiting example.

Thus, the partitioning system 200 comprises a plurality of longitudinal elements 201 for forming a support frame for at least one flexible closing element of the tarpaulin type.

As illustrated for example in FIG. 9, the frame may comprise an upper transverse cross member 202 in contact with the ceiling P, a lower transverse cross member 203 in contact with the floor S, and at least two longitudinal struts 204 in contact with two walls M or two spaced-apart parts of a wall. Alternatively, the frame may comprise at least three upper transverse cross members that are in contact with the ceiling and connected together by joining parts 100 according to the invention, and at least three lower transverse cross members that are in contact with the floor and connected together by joining parts 100 according to the invention. The transverse cross members are kept in contact with the ceiling by virtue of three props positioned between the upper and lower joining parts according to the invention.

Other configurations are possible. At any event, the system according to the invention has a very multipurpose nature by virtue of the joining part according to the invention.

The transverse cross members 203 and the longitudinal struts 204 are connected together by angular parts such as the ones described in the patent FR3018840 or in the patent FR3057596, when the longitudinal elements meet at the junction of two adjacent and perpendicular bearing surfaces, such as a wall and the ceiling or a wall and the floor.

The joining part according to the invention makes it possible to join two longitudinal elements 201 when the longitudinal elements meet at the junction of two non-adjacent bearing surfaces, typically between the ceiling and the floor, or along a surface that is not level, such as a ceiling P provided with a sloping portion SP (FIG. 9).

The joining part 100 according to the invention that is illustrated in FIGS. 1 and 2 comprises a contact pad 110 for contact with a bearing surface (the floor S or the ceiling P). The shoe 110 comprises a cylinder 111 of height h, which has a longitudinal axis X-X and is provided with a first peripheral retaining shoulder 112.

The joining part 100 also comprises two superposed rings 120-120' that are fitted freely around the cylinder 111 of the cylindrical shoe 110 in order to be mounted so as to rotate with respect to one another. The joining part according to the invention makes it possible to use, preferably, two identical rings 120-120' that are arranged in opposition about the cylinder 111 of the contact pad, thereby making it possible to limit the number of different parts for manufacturing the joining part.

The joining part 100 also comprises a support base 130 for a telescopic prop in the use position, provided with a second retaining shoulder 131. The base 130 is provided with fastening means 132 for the contact pad 110. The height h of the cylinder 111 is chosen such that the rings are free to rotate about the cylinder but butt against the two retaining shoulders 112-131 when the base 130 is fastened to the shoe 110. In other words, the rings 120, 120' have a height h1 strictly less than half the height h of the cylinder.

More specifically, the support base 130 and the contact pad 110 comprise complementary fastening means. As illustrated in FIGS. 1 and 2, these complementary fastening means may be, for example, elastically deformable claws 113 (borne advantageously by the contact pad 110) and immobilizing recesses 132 (borne advantageously by the support base 130). In this case, it is sufficient for the user to pinch the claws to deform them and disengage them from the immobilizing recesses in order to disassemble the joining part according to the invention.

Alternatively, the fastening means may be made up for example of tapped orifices and screws, if it is desired for disassembly to require the use of tools.

Figure 3:
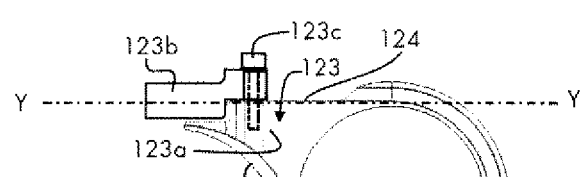
FIG. 3 shows a schematic top plan view of one of the rings of the joining part according to the invention.
Figure 4:
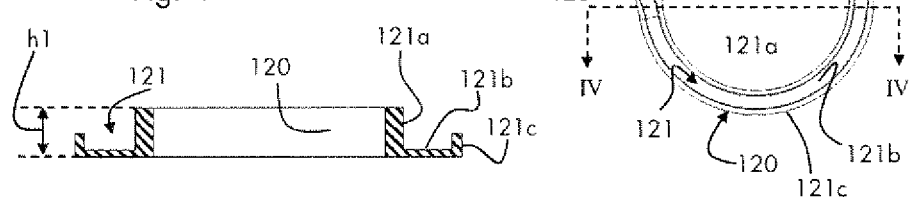
FIG. 4 shows a schematic sectional view of the ring in FIG. 3 on the section line TV-Iv.

Furthermore, as illustrated in FIGS. 3 and 4, each ring 120-120' according to the invention has a transverse peripheral rabbet 121 delimited by a rabbet end wall 121a, a rabbet bottom 121b, and a rabbet edge 121c.

Thus, the two rings 120-120' are arranged in opposition about the cylinder 111 of the contact pad 110 such that the two rabbets 121-121' together form a peripheral slot 122 for reversibly fastening a fastening seal J (see FIG. 5) of the closing element in the use position.

Each ring also comprises a means for fastening a longitudinal element of the partitioning system. Preferably, the fastening means comprises a centrifugal protrusion 123 for fastening a longitudinal element of the partitioning system in the use position.

Thus, by virtue of the joining part according to the invention, it is possible to fasten the longitudinal elements of the partitioning system in as many angular positions as desired, thereby making it possible to arrange the partitioning system in any spatial configuration.

Figure 7:
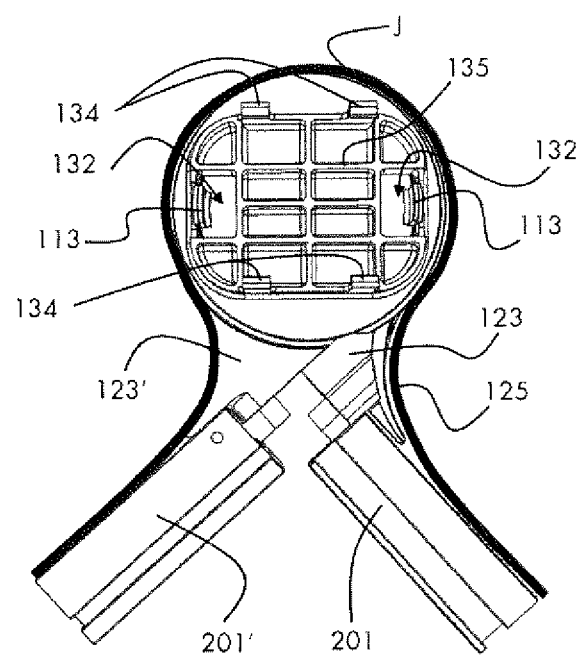
FIG. 7 shows a schematic top view of a joining part according to the invention in a 270° angular configuration.
Figure 8:
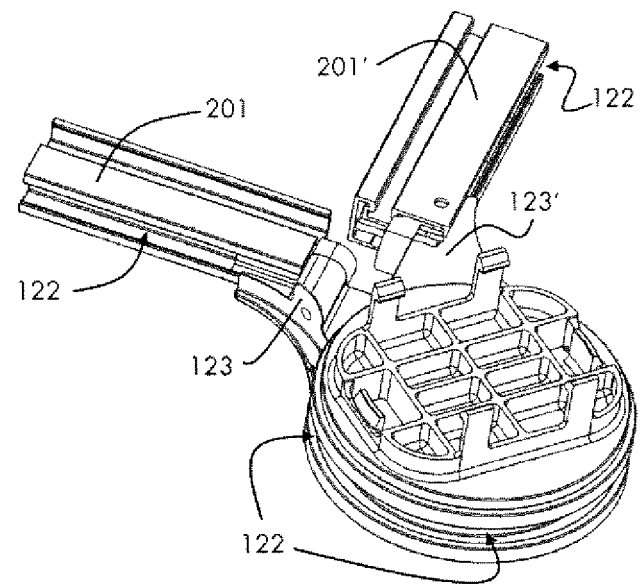
FIG. 8 shows a schematic perspective view of the joining part in FIG. 7 at a different viewing angle revealing the slot for fastening a tarpaulin fastening seal.

As illustrated in FIGS. 7 and 8, the joining part allows angular positioning up to 270° (or more depending on the dimensions of the protrusions and of the longitudinal elements of the partitioning system) while providing a continuous peripheral fastening slot 122, ensuring perfectly sealed fastening of the tarpaulin by a seal, regardless of the relative angle between the two protrusions 123-123'.

Any type of tarpaulin can be used, in particular, but not exclusively, a tarpaulin made of polymer material, such as polyethylene, in particular tarpaulins of the brand Polyane®.

The structure of the joining part according to the invention thus makes it possible to hold the upper transverse cross members (in contact with the ceiling) and lower transverse cross members (in contact with the floor), regardless of the configuration of the premises and/or of the partitioning desired.

Another considerable advantage is that the joining part remains outside the zone delimited by the closing element (the tarpaulin), regardless of the relative angle between the two protrusions 123-123'. It is therefore possible to carry out work that generates toxic dust without risking contaminating the joining parts. However, the entirely disassemblable structure of the joining part makes it nevertheless possible to deep clean it.

According to a preferred embodiment, each protrusion 123-123' advantageously comprises a fixed portion 123a-

Figure 6:
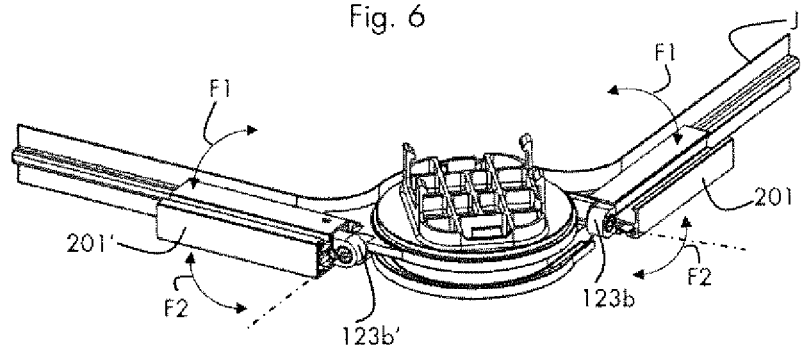
FIG. 6 shows a schematic perspective view of the joining part in FIG. 5 at a different viewing angle revealing the rotational mounting of the protrusions for fastening the longitudinal elements to the rings.

123*a*' for connecting to the ring 120-120' and a pivoting portion 123*b*-123*b*' for fastening a longitudinal element of the partitioning system, said pivoting portion 123*b*-123*b*' being mounted on the fixed portion 123*a*-123*a*' so as to be able to pivot about a pin 123*c*-123*c*' (see arrows F1 and F2 in FIG. 6) between a position coplanar with the ring 120-120' that bears said protrusion and a position perpendicular to the plane of the ring 120-120' that bears said protrusion.

This embodiment allows a more multipurpose nature of the joining part according to the invention which allows angular adjustment in one and the same plane, by virtue of the rotary rings, but also angular adjustment in different planes, by virtue of the pivoting fastening portions 123*b*.

Figure 5:
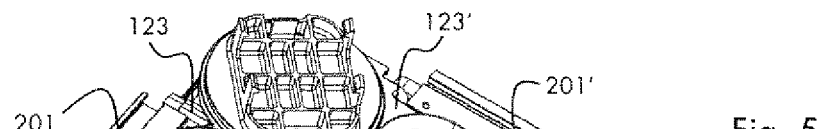
FIG. 5 shows a schematic perspective view of a joining part according to the invention engaged between two longitudinal elements of a system for partitioning a premises, in a 90° angular configuration, and into which a tarpaulin fastening seal has been inserted.

Preferably, as illustrated in FIG. 5 which is also applicable to a ring 120', the fixed portion 123*a* of the protrusion 123 extends in a direction Y-Y substantially tangential to the ring. To this end, the fixed portion 123*a* of the protrusion 123 comprises a rectilinear edge 124, a proximal end of which is connected tangentially to the end wall 121*a* of the rabbet 121 of the ring. The rectilinear edge 124 is continued at its distal end by a concave curved edge 125 connected tangentially to the edge 121*c* of the rabbet 121. Since the edge 121*c* of the rabbet is convex, there is an inversion of curvature between the ring and the protrusion. This inversion of curvature ensures regular fastening of the seal (and therefore of the tarpaulin) in the peripheral slot 122, and maintains perfect sealing of the fastening regardless of the relative angular position of the protrusions 123-123' (see FIGS. 7 and 8).

The structure of the joining part 100 according to the invention makes it possible to adapt it to any type of existing partitioning system, in particular those in which the longitudinal elements are made up of profiled sections, for example the ones described in the patents FR3018847, FR3018840, FR3018841 and FR3057596.

To this end, the pivoting fastening portion 123*b*-123*b*' of each protrusion 123-123' has a fastening end 123*d*-123*d*' with a section complementary to a longitudinal element 201-201' of the partitioning system in order that the pivoting portion and the longitudinal element are reversibly fastened by insertion in the use position. In the embodiment illustrated in FIG. 6, the fastening ends of the pivoting portions 123*b*-123*b*' are both inserted into the corresponding longitudinal element. Alternatively, as illustrated in FIG. 11, a pivoting portion 123*b*" may comprise an end 123*d*" having a section complementary to the longitudinal element J such that it is the latter that is inserted into the end 123*d*" so that the pivoting portion and the longitudinal element J are reversibly fastened by insertion.

The reversible fastening may be obtained in a number of ways. For example, the longitudinal elements comprise a through-screw which can be screwed into contact with the pivoting fastening portion 123 inserted into the longitudinal element 201-201'.

Alternatively, the pivoting fastening portion 123 may be dimensioned so as to require force-fitting into the profiled section of the longitudinal element.

Also alternatively, the longitudinal elements may comprise a hole at their end and the pivoting fastening portion 123 may comprise a retractable spring-mounted peg that is intended to immobilize the longitudinal element when it is inserted into the hole in the latter. To remove the longitudinal element, the user presses on the peg, which retracts and allows the longitudinal element to be removed.

The support base 130 of the joining part 100 according to the invention is intended to receive a prop and, more particularly, one end of a prop, so that the joining part is forcibly pressed against a surface and remains in position.

Advantageously, the support base 130 comprises means for reversibly fastening the prop in the use position. This avoids a situation in which the prop slips on the support base.

In a simpler embodiment, which is not illustrated, the reversible fastening means are made up of a vertical shoulder, that is to say a shoulder perpendicular to that surface 133 of the support base 130 that is intended to be in contact with the prop.

Advantageously, as illustrated in particular in FIGS. 1 and 2, the reversible fastening means comprise retaining claws 134 configured to snap in place reversibly against one end of the prop in the use position.

Generally, a prop comprises a telescopic longitudinal portion, a means for clamping in the deployed position, and two bearing ends usually made up of bearing plates that are mounted in a pivotable manner on the telescopic longitudinal portion.

The claws 134 are therefore designed to deform elastically when an end plate is forcibly pressed against them, and then to return to their original shape to immobilize the plate against the support base 130.

Other reversible fastening means may be envisioned, for example, and in a nonlimiting manner, a magnet or a loop under which the end plate is slid.

Likewise advantageously, the support base 130 comprises a reinforcing grid 135 perpendicular to the surface of the support base 130. This reinforcing grid makes it possible to apply a compressive force of several hundred kilos, which is very largely sufficient to ensure that the prop immobilizes in position the joining part(s) in contact with its end(s).

Alternatively or in combination, the contact pad 110 may also comprise a reinforcing grid, for example inside the cylinder if the latter is hollow. This embodiment has the advantage of limiting the quantity of material required for manufacture, and of limiting the weight of the joining part according to the invention, while ensuring optimal compressive strength.

The invention also relates to a telescopic prop for an above-described partitioning system, the prop comprising a telescopic longitudinal portion, a means for clamping in the deployed position, and two bearing ends, at least one of which is fastened to a support base of a joining part according to the invention, in a reversible manner or in a non-reversible manner.

It is thus possible to sell props that directly comprise one or two joining parts according to the invention (which are or are not removable).

Advantageously, the telescopic prop according to the invention also comprises a telescopic longitudinal portion provided with a frontal face comprising a continuous longitudinal groove for fastening the closing element. This groove advantageously has the same profile as the groove of the longitudinal elements of the closing system.

The invention also relates to a system for partitioning a premises of the type delimited by a floor S, a ceiling P-SP, and walls M, the system comprising at least two telescopic props and a plurality of longitudinal elements for forming a frame comprising in particular a flexible closing element of the tarpaulin type. According to the invention, the partitioning system comprises at least one joining part according to the invention, preferably twice as many joining parts as there are props, in order to ensure perfect sealing at the floor and at the ceiling.

To this end, the partitioning system according to the invention comprises longitudinal elements for forming the frame which comprise a frontal face, in the use position, provided with a continuous peripheral groove for fastening the closing element.

Rather than comprising known props and joining parts according to the invention, the partitioning system may comprise props according to the invention, which are directly equipped with joining parts according to the invention.

In order to partition a premises of the type delimited by a floor S, a ceiling P-SP, and walls M, with a partitioning system according to the invention, the starting point is to position on the floor the joining parts according to the invention at the locations in the premises where an angular member or propping is necessary.

A lower end of a prop is positioned on each joining part positioned on the floor, and a joining part is positioned at the other, upper end of each prop, and then the telescopic longitudinal portion of each prop is deployed until the joining part at the upper end thereof is forcibly pressed against the ceiling.

Alternatively, if use is made of props according to the invention directly comprising joining parts at the ends thereof, the above steps take place concurrently, meaning that the props are positioned at the locations in the premises where an angular member or propping is necessary and they are deployed until the joining part at the upper end thereof is forcibly pressed against the ceiling.

Next, in both cases, the means for clamping in the deployed position is activated such that each prop is forcibly compressed between the floor and the ceiling by way of the joining parts.

In this position, it is then possible to pivot the rings of each joining part into a desired angular position to configure the partitioning of the premises, even if the prop is in the bearing position.

Specifically, in spite of the force applied to the support base, the latter transmits it directly to the contact pad without immobilizing the rings, which remain free to rotate about the cylinder of the shoe.

Thus, the angular adjustment can be effected after the props have been fastened, this being very practical.

Once the desired angular position has been obtained, the longitudinal elements 201-201' for forming a frame are fastened to the protrusions 123-123' of the rings of the joining parts until a frame comprising an upper transverse cross member in contact with the ceiling, a lower transverse cross member in contact with the floor and at least two longitudinal struts in contact with two walls or two spaced-apart parts of a wall is formed.

In the example illustrated in FIG. 9, the props 300 and the joining parts 100 have thus been disposed on either side of the sloping ceiling SP. Then, the frame has been formed with the longitudinal elements 201.

An upper transverse cross member 202 in contact with the ceiling P, a lower transverse cross member 203 in contact with the floor S, and at least two longitudinal struts 204 in contact with two walls M have thus been formed. The cross members 202 and 203 each comprise three segments, 202a-202b-202c and 203a-203b-203c, respectively. The segments 202a-202c and 203a-203c are each inserted between a fastening portion of a joining part 100 according to the invention and a corner part 205.

The segments 202b and 203b are inserted between a fastening portion of two joining parts 100 according to the invention, such that the longitudinal elements of the frame are perfectly pressed against the floor, the ceiling including the sloping portion, and against the opposite walls.

To end with, the flexible closing element of the tarpaulin type is fastened to the longitudinal elements of the frame, such that the partition is sealed at the floor, at the ceiling, and against the walls.

To this end, preferably, the longitudinal elements 201-201' of the frame comprise a frontal face (that is to say on the same side, in use, as the slot 122 of the joining part according to the invention) provided with a continuous longitudinal groove for fastening the closing element. In this case, the closing element is fastened by gripping the edge of the closing element in the continuous longitudinal groove of the longitudinal elements and by force-fitting metal clips into said groove on top of the tarpaulin, and then by force-fitting a continuous seal into the metal clips and into said groove. Of course, the same operations are carried out at the peripheral slots 122 of the joining parts 100.

The system according to the invention allows very easy partitioning and/or protection, without requiring fastening of fastening battens to a wall, to the floor or to the ceiling. It can be used for partitioning, in the middle of a room for example, or for protection, along one or more walls for example.

Thus, the system according to the invention has a very multipurpose nature, as illustrated by way of example in FIG. 10.

Thus, in this figure, it is apparent that the system according to the invention allows the creation of a U-shaped airlock 400 around an opening O in a wall.

This airlock 400 is delimited, against the wall, by conventional vertical struts 401 such as the ones described in the abovementioned patents. Opposite these struts 401, the airlock is delimited by two props 300 that are each compressed between two joining parts 100 according to the invention, one arranged in contact with the floor and the other arranged in contact with the ceiling (not illustrated for the sake of clarity).

The airlock 400 comprises three upper transverse cross members 402 and three lower transverse cross members 403 made up of longitudinal elements 201 fastened to the fastening portions 123b-123b' of the joining parts 100 and to the corner parts 205.

The props 300 forcibly pressed against the floor and the ceiling by way of the joining parts 100 also contribute to the pressing of the vertical struts 401 by virtue of the rigidity of the longitudinal elements 201.

The system according to the invention also makes it possible to create a closure 500 of the opening O in the wall, the closure being realized by contact with the wall by virtue of the props 301. The latter are each compressed between two joining parts 100 according to the invention, one arranged in contact with the floor and the other arranged in contact with the ceiling.

The longitudinal elements 201 of the upper transverse cross member 502 are fastened to the fastening portions 123b-123b' of the joining parts 100 in contact with the ceiling. In a complementary manner, the vertical struts 501 are each fastened to a fastening portion 123b-123b' of a joining part 100 in contact with the ceiling and to a fastening portion 123b-123b' of a joining part 100 in contact with the floor. Advantageously, a lower cross member may be fastened between the remaining fastening portions 123b-123b' of the joining parts 100.

In one advantageous embodiment of a ring 120", the invention provides for the pivoting portion 123b" of each protrusion to be reversibly fastened without the use of tools to the fixed portion 123a".

In the exemplary embodiment illustrated, the pivoting portion 123b″ of each protrusion has a hook-shaped fastening end 123e intended to engage reversibly around the pivot pin 123c″ fastened to the fixed portion 123a″ of the protrusion.

Preferably, the hook-shaped fastening end 123e comprises a notch for reversibly immobilizing the pin 123c″ to avoid accidental disconnection of the pivoting portion and the pin.

Thus, the pivoting portion 123b″ fastened to the longitudinal element J may be hooked around the pivot pin 123c″ after the joining part has been installed and forcibly held in position by the prop.

Of course, the embodiment illustrated in FIG. 11 is given by way of nonlimiting example.

Thus, the two pivoting portions of the two protrusions may have a hook-shaped fastening end 123e. Similarly, the end 123d-123d′-123d″ of the pivoting portions for fastening to the longitudinal element of the frame may have a section complementary to said longitudinal element such that the latter is inserted into the pivoting portion or such that the pivoting portion is inserted into the longitudinal element.

By virtue of the system according to the invention, it is no longer necessary to fasten the closing system in the frame of the door, thereby making it possible to close the door in order to secure the site.

The joining part is advantageously made of polymer material, in particular, but not essentially, injection-molded with reinforcing fibers such as glass fibers, since its structure allows it to be manufactured by injection molding. Moreover, since the two rings are advantageously identical, they require only one mold.

The invention claimed is:

1. A joining part (100) for a system (200) for partitioning and protecting a premises delimited by a floor(S), a ceiling (P, SP), and walls (M), the system (200) comprising at least two telescopic props and a plurality of longitudinal elements (201, 201′) for forming a support frame for at least one flexible closing element of the tarpaulin type, characterized in that the joining part comprises:
   a contact pad (110) with a bearing surface comprising a cylinder (111) of given height (h) that has a longitudinal axis (X-X) and is provided with a first peripheral retaining shoulder (112);
   two superposed rings (120, 120′) that have been fitted around the cylinder (111) of the contact pad and are mounted so as to rotate with respect to one another, each ring having a transverse peripheral rabbet (121, 121′) delimited by a rabbet end wall (121a), a rabbet bottom (121b), and a rabbet edge (121c), the two rabbets together forming, in a use position, a peripheral slot (122) for reversibly fastening a fastening seal (J) of the closing element, each ring also comprising a centrifugal protrusion (123, 123′) for fastening a longitudinal element (201, 201′) of the partitioning and protecting system in the use position;
   support base (130) for a telescopic prop (300, 301) in the use position, provided with a second retaining shoulder (131), the support base (130) and the contact pad (110) comprising complementary fastening means (113-132), the height (h) of the cylinder (111) being chosen such that the rings (120, 120′) are free to rotate about the cylinder (111) but butt against the two retaining shoulders (112-131) when the base (130) is fastened to the contact pad (110).

2. The joining part as claimed in claim 1, wherein the two rings (120, 120′) are identical and arranged in opposition about the cylinder of the contact pad.

3. The joining part as claimed in claim 1, wherein each protrusion (123, 123′) comprises a fixed portion (123a, 123a′) for connecting to the ring and a pivoting portion (123b, 123b′) for fastening a longitudinal element (201, 201′) of the partitioning and protecting system, said pivoting portion (123b, 123b′) being mounted on the fixed portion (123a, 123a′) so as to be able to pivot about a pivot pin (123c-123c′) between a position coplanar with the ring that bears the protrusion and a position perpendicular to the ring that bears the protrusion.

4. The joining part as claimed in claim 3, wherein the fixed portion (123a, 123a′) comprises a rectilinear edge (124) connected tangentially to the end wall (121a) of the rabbet (121) of the ring and extended by a concave curved edge (125) connected tangentially to the edge (121c) of the rabbet (121).

5. The joining part as claimed in claim 3, wherein the pivoting portion (123b, 123b′) for fastening each protrusion has an end (123d, 123d′, 123d″) with a section complementary to a longitudinal element (201, 201′) of the partitioning and protecting system in order that the pivoting portion and the longitudinal element are reversibly fastened by insertion in the use position.

6. The joining part as claimed in claim 3, wherein the pivoting portion (123b″) of each protrusion has a hook-shaped fastening end (123e) intended to be fitted reversibly around the pivot pin (123c″) fastened to the fixed portion (123a, 123a′).

7. The joining part as claimed in claim 1, wherein the support base (130) for a prop comprises means (134) for reversibly fastening the prop in the use position.

8. The joining part as claimed in claim 7, wherein the means (134) for reversible fastening comprise retaining claws designed to snap into place reversibly against one end of the prop in the use position.

9. The joining part as claimed in claim 1, wherein the support base and/or the contact pad comprises a reinforcing grid (135) perpendicular to the support base (130).

10. A telescopic prop (300, 301) for a system (200) for partitioning and protecting a premises delimited by a floor (S), a ceiling (P, SP), and walls (M), the system (200) being of the type comprising at least two telescopic props and a plurality of longitudinal elements (201, 201′) for forming a support frame for at least one flexible closing element (B) of the tarpaulin type, the telescopic prop comprising a telescopic longitudinal portion, a means for clamping in the deployed position, and two bearing ends, characterized in that at least one of the bearing ends is fastened to a joining part (100) as claimed in claim 1 by the support base (130) of the joining part.

11. The telescopic prop as claimed in claim 10, wherein the support base of the joining part is fastened reversibly to the bearing end.

12. The telescopic prop as claimed in claim 10, wherein the support base of the joining part is fastened non-reversibly to the bearing end.

13. The telescopic prop as claimed in claim 10, wherein the telescopic longitudinal portion comprises a frontal face, in the use position, comprising a continuous longitudinal groove for fastening the closing element (B).

14. A system for partitioning and protecting a premises delimited by a floor(S), a ceiling (P, SP), and walls (M), the system (200) comprising:

at least two telescopic props, a plurality of longitudinal elements (201, 201') for forming a support frame for at least one flexible closing element (B) of the tarpaulin type, and at least one joining part (100) as claimed in claim 1.

15. The partitioning and protecting system as claimed in claim 14, wherein the longitudinal elements (201, 201') for forming a frame comprise a frontal face, in the use position, provided with a continuous peripheral groove for fastening the closing element (B).

16. The partitioning and protecting system as claimed in claim 14, wherein at least one of the at least two telescoping props further comprises a telescopic longitudinal portion, a means for clamping in the deployed position, and two bearing ends, characterized in that at least one of the bearing ends is fastened to the joining part (100).

17. A method for partitioning and protecting a premises of the type delimited by a floor(S), a ceiling (P, SP), and walls (M), with a partitioning and protecting system comprising:

at least two telescopic props, a plurality of longitudinal elements (201, 201') for forming a support frame for at least one flexible closing element (B) of the tarpaulin type, and a plurality of the joining part (100) as claimed in claim 1, the method comprising the following steps:

A) positioning on the floor the plurality of joining parts (100) at locations in the premises where an angular member or propping is necessary, each joining part (100) comprising:

a contact pad (110) with a bearing surface comprising a cylinder (111) of given height (h) that has a longitudinal axis (X-X) and is provided with a first peripheral retaining shoulder (112);

two superposed rings (120, 120') that have been fitted around the cylinder (111) of the contact pad and are mounted so as to rotate with respect to one another, each ring having a transverse peripheral rabbet (121, 121') delimited by a rabbet end wall (121*a*), a rabbet bottom (121*b*), and a rabbet edge (121*c*), the two rabbets together forming, in a use position, a peripheral slot (122) for reversibly fastening a fastening seal (J) of the closing element, each ring also comprising a centrifugal protrusion (123, 123') for fastening a longitudinal element (201, 201') of the partitioning and protecting system in the use position; and a support base (130) for each of the telescopic props (300, 301) in the use position, provided with a second retaining shoulder (131), the support base (130) and the contact pad (110) comprising complementary fastening means (113-132), the height (h) of the cylinder (111) being chosen such that the rings (120, 120') are free to rotate about the cylinder (111) but butt against the two retaining shoulders (112-131) when the base (130) is fastened to the contact pad (110);

B) positioning a lower end of each of the telescopic props (300, 301) on each joining part positioned on the floor, and positioning one of the plurality of joining parts at an upper end of each telescopic prop, then deploying the telescopic longitudinal portion of each telescopic prop until the joining part at the upper end thereof is forcibly pressed against the ceiling, then activating the means for clamping in the deployed position such that each telescopic prop is forcibly compressed between the floor and the ceiling by way of the joining parts;

C) pivoting the rings (120, 120') of each joining part into a desired angular position to configure the partitioning of the premises;

D) fastening longitudinal elements (201, 201') for forming a frame to the protrusions of the rings of the joining parts until a frame suitable for a desired configuration is formed; and E) fastening the flexible closing element (B) of the tarpaulin type to the longitudinal elements of the frame.

\* \* \* \* \*